US012068000B2

(12) United States Patent
Gonzales, Jr.

(10) Patent No.: US 12,068,000 B2
(45) Date of Patent: Aug. 20, 2024

(54) DETERMINING A RESPONSE OF A CROWD

(71) Applicant: eBay Inc., San Jose, CA (US)

(72) Inventor: Sergio Pinzon Gonzales, Jr., San Jose, CA (US)

(73) Assignee: EBAY INC., San Jose, CA (US)

( * ) Notice: Subject to any disclaimer, the term of this patent is extended or adjusted under 35 U.S.C. 154(b) by 624 days.

(21) Appl. No.: 16/710,169

(22) Filed: Dec. 11, 2019

(65) Prior Publication Data

US 2020/0184993 A1 Jun. 11, 2020

Related U.S. Application Data

(63) Continuation of application No. 14/831,334, filed on Aug. 20, 2015, now Pat. No. 10,540,991.

(51) Int. Cl.

*H04N 21/60* (2011.01)
*G06Q 30/08* (2012.01)
*G10L 25/51* (2013.01)

(52) U.S. Cl.

CPC .............. *G10L 25/51* (2013.01); *G06Q 30/08* (2013.01)

(58) Field of Classification Search

CPC ............................... H04N 21/20; H04N 21/40
See application file for complete search history.

(56) References Cited

U.S. PATENT DOCUMENTS 5,581,650 A 12/1996 Kamiya
5,893,057 A 4/1999 Fujimoto et al.
8,571,859 B1 10/2013 Aleksic et al.
9,584,874 B1 * 2/2017 Farías .............. H04N 21/44213
10,134,425 B1 * 11/2018 Johnson, Jr. ............ G10L 15/05
10,300,394 B1 * 5/2019 Evans ..................... A63F 13/86
10,540,991 B2 1/2020 Gonzales, Jr.
10,864,447 B1 * 12/2020 Willette ................. A63F 13/86
2002/0111146 A1 8/2002 Fridman et al.
2002/0111794 A1 8/2002 Yamamoto et al.
2003/0033600 A1 * 2/2003 Cliff ....................... A61B 5/162 725/12
2005/0018828 A1 1/2005 Nierhaus et al.
2005/0091274 A1 4/2005 Stanford
2006/0080224 A1 4/2006 Schuelke et al.
2006/0149547 A1 7/2006 Miyazaki
2006/0206408 A1 * 9/2006 Nassiri ................... G06Q 40/04 705/37
2006/0259922 A1 * 11/2006 Sandgren .............. G06Q 30/02 725/9
2008/0154612 A1 6/2008 Evermann et al.

(Continued)

OTHER PUBLICATIONS

Applicant-Initiated Interview Summary Received for U.S. Appl. No. 14/831,334, mailed on Aug. 23, 2019, 4 pages.

(Continued)

*Primary Examiner* — Mushfikh I Alam
(74) *Attorney, Agent, or Firm* — SCHWEGMAN LUNDBERG & WOESSNER, P.A.

(57) ABSTRACT

In various example embodiments, a system and method for determining a crowd response for a crowd are presented. One method is disclosed that includes receiving an audio signal that includes concurrent responses from two or more respondents, determining the concurrent responses from the audio signal without regard to the identity of the respondents, and generating a crowd based on the concurrent responses.

20 Claims, 14 Drawing Sheets

(56) References Cited

U.S. PATENT DOCUMENTS

| | | | | |
|---|---|---|---|---|
| 2008/0221987 | A1* | 9/2008 | Sundaresan | G06Q 30/0277 705/14.54 |
| 2011/0004474 | A1* | 1/2011 | Bansal | H04H 60/45 715/764 |
| 2011/0016015 | A1* | 1/2011 | Bolivar | G06Q 30/0601 706/52 |
| 2011/0206198 | A1* | 8/2011 | Freedman | H04M 3/51 379/265.03 |
| 2012/0174032 | A1* | 7/2012 | Greene | H04N 21/4788 715/811 |
| 2014/0089801 | A1* | 3/2014 | Agrawal | H04N 21/6582 715/719 |
| 2014/0195919 | A1* | 7/2014 | Wieder | H04L 67/306 715/730 |
| 2015/0035644 | A1 | 2/2015 | June et al. | |
| 2015/0148071 | A1 | 5/2015 | Elmore et al. | |
| 2016/0019026 | A1* | 1/2016 | Gupta | G06F 3/167 704/233 |
| 2016/0209992 | A1* | 7/2016 | Rosenberg | H04L 67/12 |
| 2016/0226610 | A1* | 8/2016 | Pinzon Gonzales, Jr. | H04N 21/466 |
| 2016/0300584 | A1 | 10/2016 | Pandey et al. | |
| 2017/0053664 | A1 | 2/2017 | Gonzales, Jr. | |
| 2017/0374402 | A1* | 12/2017 | Pogorelik | H04N 21/4756 |
| 2019/0022351 | A1* | 1/2019 | McCarthy | A61M 21/00 |
| 2021/0385264 | A1* | 12/2021 | Robertson | H04N 21/8549 |

OTHER PUBLICATIONS

Final Office Action received for U.S. Appl. No. 14/831,334, mailed on Nov. 29, 2017, 33 pages.
Final Office Action received for U.S. Appl. No. 14/831,334, mailed on Jun. 6, 2019, 25 pages.
First Action Interview—Office Action Summary received for U.S. Appl. No. 14/831,334, mailed on Apr. 17, 2017, 8 pages.
Non-Final Office Action received for U.S. Appl. No. 14/831,334, mailed on Mar. 6, 2019, 22 pages.
Notice of Allowance received for U.S. Appl. No. 14/831,334, mailed on Sep. 11, 2019, 12 pages.
Response to Final Office Action filed on Apr. 30, 2018 for U.S. Appl. No. 14/831,334, mailed on Nov. 29, 2017, 16 pages.
Response to Final Office Action filed on Aug. 21, 2019, for U.S. Appl. No. 14/831,334, mailed on Jun. 6, 2019, 12 pages.
Response to First Action Interview—Pre-interview Communication filed on Jan. 18, 2017, for U.S. Appl. No. 14/831,334, mailed on Nov. 18, 2016, 13 pages.
Response to First Action Interview filed on Aug. 17, 2017, for U.S. Appl. No. 14/831,334, mailed on Apr. 17, 2017, 12 pages.
Response to Non-Final Office Action filed on Apr. 22, 2019, for U.S. Appl. No. 14/831,334, mailed on Mar. 6, 2019, 10 pages.
Applicant Initiated Interview Summary received for U.S. Appl. No. 14/831,334 mailed on Mar. 30, 2018, 4 pages.
First Action Interview—Pre-interview Communication received for U.S. Appl. No. 14/831,334, mailed on Nov. 18, 2016, 5 pages.

* cited by examiner

700

702

CROWD RESPONSE

| YES | NO |
|---|---|
| 14 | 8 |

YES

704

BREAKDOWN

| | YES | NO | |
|---|---|---|---|
| Caucasian | 1 | 3 | NO |
| African American | 6 | 2 | YES |
| Asian | 7 | 3 | YES |

*FIG. 7*

800

CROWD RESPONSE

SONG A

804

CROWD RESPONSE BREAKDOWN

| SONG A | SONG B | SONG C |
|---|---|---|
| 8 | 2 | 1 |

| | |
|---|---|
| Person A | Song A |
| Voice B | Song C |
| Person C | Song A |
| Person D | Song B |
| Person E | Song A |
| Voice F | Song B |
| Person G | Song A |
| Person H | Song A |
| | . |
| | . |
| | . |

*FIG. 8*

DETERMINING A RESPONSE OF A CROWD

CLAIM OF PRIORITY

This Application is a Continuation of U.S. application Ser. No. 14/831,334, filed Aug. 20, 2015, which is hereby incorporated by reference in its entirety.

TECHNICAL FIELD

Embodiments of the present disclosure relate generally to audio communications and, more particularly, but not by way of limitation, to determining a response of a crowd.

BACKGROUND

Determining a response of a crowd of people occurs in many different scenarios. In some examples, responses from people in the crowd are counted. In another example, the respondents indicate their preference visually, such as by a raise of hand or other gesture. In one example, respondents that prefer one or another outcome are requested to shout for that outcome and a judge determines the sentiment of the crowd based on the loudest response.

In other examples, a respondent shouts a response, but it may not be heard, or a judge for the sentiment of the crowd may not be able to identify the person that provided the response. Furthermore, although a system may be trained to hear certain voices, identifying vocal responses and determining a general response for the crowd is more challenging.

BRIEF DESCRIPTION OF THE DRAWINGS

Various ones of the appended drawings merely illustrate example embodiments of the present disclosure and cannot be considered as limiting its scope.

FIG. 7 is a chart depicting a response according to one example embodiment.

FIG. 8 is another chart depicting a response according to one example embodiment.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In various example embodiments, a question or inquiry is posed to a crowd of people. A system, as described herein, is configured to receive an audio signal that includes the various concurrent responses of the people in the crowd. The system discerns distinct vocal patterns included in the audio signal and aggregates the current responses into a crowd response. A crowd response, as described herein, includes, but is not limited to, a response for a crowd, a representative response for the crowd, an aggregate response for the crowd, a sentiment for the crowd, a loudest response from the crowd, a highest pitched response from the crowd, a lowest response from the crowd, a response that represents a highest value of the concurrent responses, an opinion of the crowd of people, voting results for the crowd, or the like, or any other response for one or more people in the crowd.

In another example embodiment, the multi-response system receives an indicator from a user that indicates a type of crowd response to generate. Example responses include, but are not limited to, a majority response, a highest response, a minority response, a most popular response, a most unique response, a loudest response, a quietest response, an average response, or other, or the like. Therefore, in certain examples, a user may configure the multi-response system 150 to generate a wide variety of different responses as described herein.

Furthermore, the system may also be configured to determine cultural properties of the respondents based, at least in part, on accent, inflection usage, and/or other audio properties of the various responses. In another example, the system identifies known vocal patterns and identifies known persons in the crowd of people. In another example embodiment, the system gives increased weight to a response from a known person, or a response with increased intensity, or other distinct characteristic.

Figure 4:
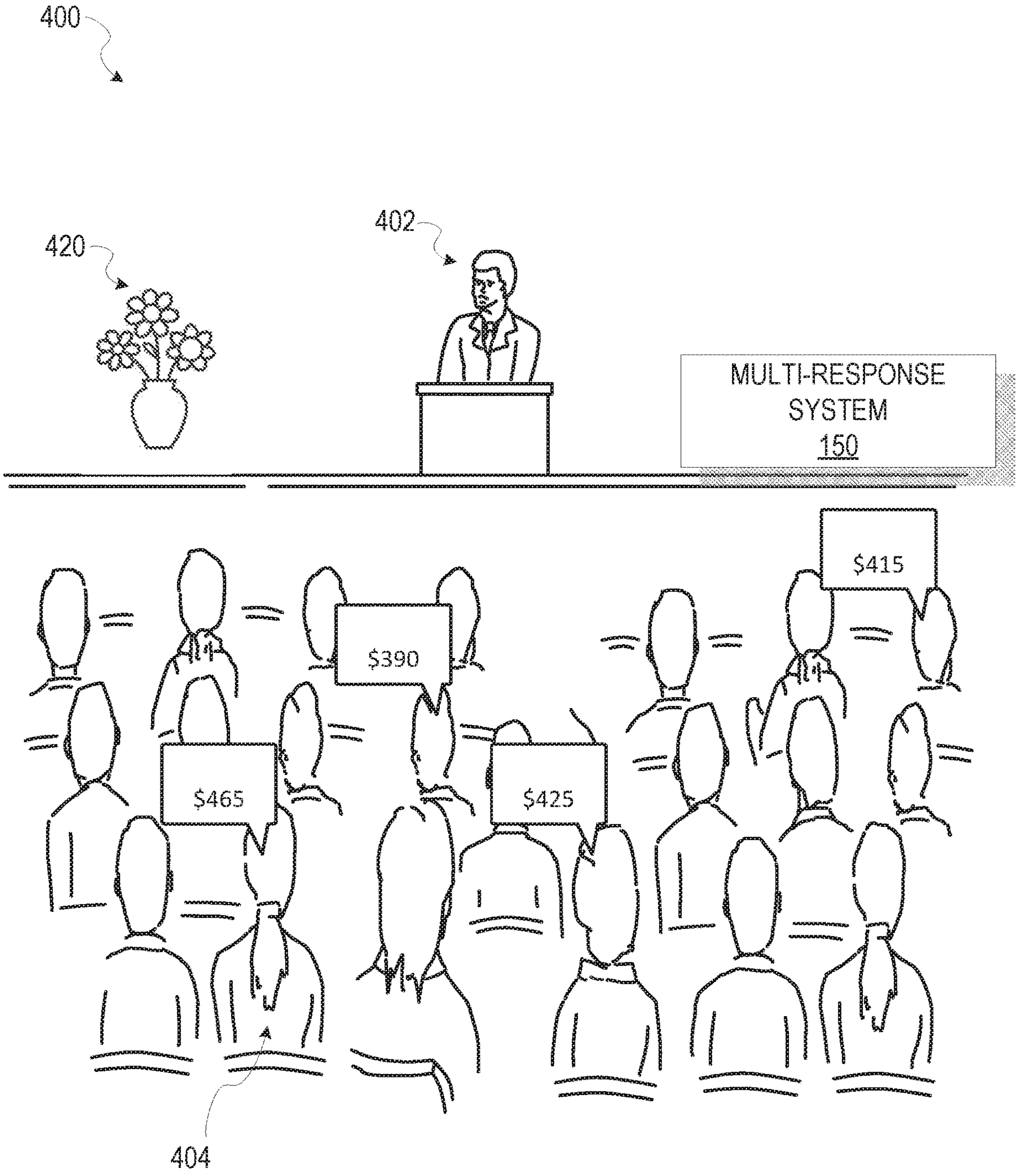
FIG. 4 is an illustration depicting one scenario for determining a response of a crowd, according to an example embodiment.

In another example scenario, as further described in FIG. 4, a system may receive many concurrent bids from bidders at a live auction and determine the high bid, the location of the high bidder, and cultural properties of the high bidder. Such determinations increase the speed and efficiency of the live bidding process.

In another example scenario, the system allows unknown persons to express a preference for a specific outcome to be expressed in a public forum without being recognized by the forum as will be further described. Because people may respond differently in response to being recognized, the system facilitates more candid responses from a group of persons.

Figure 1:
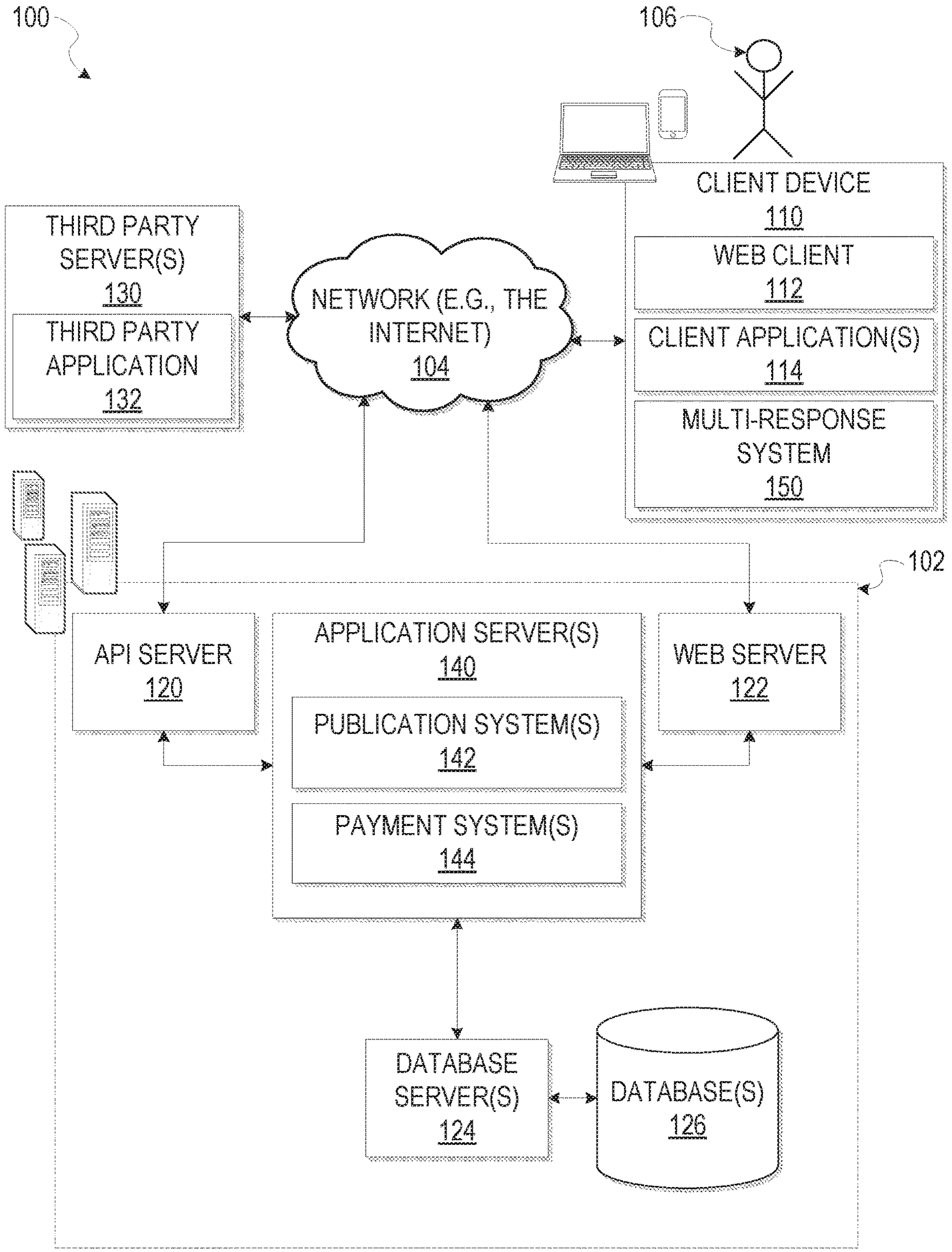
FIG. 1 is a block diagram illustrating a networked system, according to some example embodiments.

With reference to FIG. 1, an example embodiment of a high-level client-server-based network architecture 100 is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Washington State), client application(s) 114, and a multi-response system 150 as will be further described, executing on the client device 110.

The client device 110 may comprise, but is not limited to, a mobile phone, desktop computer, laptop, portable digital assistant (PDAs), smart phone, tablet, ultra book, netbook, laptop, multi-processor system, microprocessor-based or programmable consumer electronics, game console, set-top box, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screen, accelerometer, gyroscope, cameras, microphone, global positioning system (GPS) device, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions.

One or more users 106 may be a person, a machine, or other means of interacting with the client device 110. In embodiments, the user 106 is not part of the network architecture 100, but may interact with the network architecture 100 via the client device 110 or another means. For example, one or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment, etc.). Conversely, if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application server(s) 140. The application server(s) 140 may host one or more publication system 142 and payment system 144, each of which may comprise one or more modules or applications and each of which may be embodied as hardware, software, firmware, or any combination thereof. The application server(s) 140 are, in turn, shown to be coupled to one or more database servers 124 that facilitate access to one or more information storage repositories or database(s) 126. In an example embodiment, the database(s) 126 are storage devices that store information to be posted (e.g., publications or listings) to the publication system(s) 142. The database(s) 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication system(s) 142 may provide a number of publication functions and services to users 106 that access the networked system 102. The payment system(s) 144 may likewise provide a number of functions to perform or facilitate payments and transactions. While the publication system(s) 142 and payment system(s) 144 are shown in FIG. 1 to both form part of the networked system 102, it will be appreciated that, in alternative embodiments, each system 142 and 144 may form part of a payment service that is separate and distinct from the networked system 102. In some embodiments, the payment system(s) 144 may form part of the publication system(s) 142.

The multi-response system 150 provides functionality operable to determine a crowd response based on concurrent responses from a group of people. The group of people may be gathered to vote, bid, determine an outcome, provide an opinion, or other, or the like.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system(s) 142, payment system(s) 144, and multi-response system 150 could also be implemented as standalone software programs, which do not necessarily have networking capabilities.

The web client 112 may access the various publication and payment systems 142 and 144 via the web interface supported by the web server 122. Similarly, the multi-response system 150 may communicate with the networked system 102 via a programmatic client. The programmatic client accesses the various services and functions provided by the publication and payment systems 142 and 144 via the programmatic interface provided by the API server 120. The programmatic client may, for example, be a seller application (e.g., the Turbo Lister application developed by eBay® Inc., of San Jose, California) to enable sellers to author and manage listings on the networked system 102 in an off-line manner, and to perform batch-mode communications between the programmatic client and the networked system 102.

Additionally, a third party application(s) 132, executing on a third party server(s) 130, is shown as having programmatic access to the networked system 102 via the programmatic interface provided by the API server 120. For example, the third party application 132, utilizing information retrieved from the networked system 102, may support one or more features or functions on a website hosted by the third party. The third party website may, for example, provide one or more promotional, marketplace, or payment functions that are supported by the relevant applications of the networked system 102.

Figure 2:
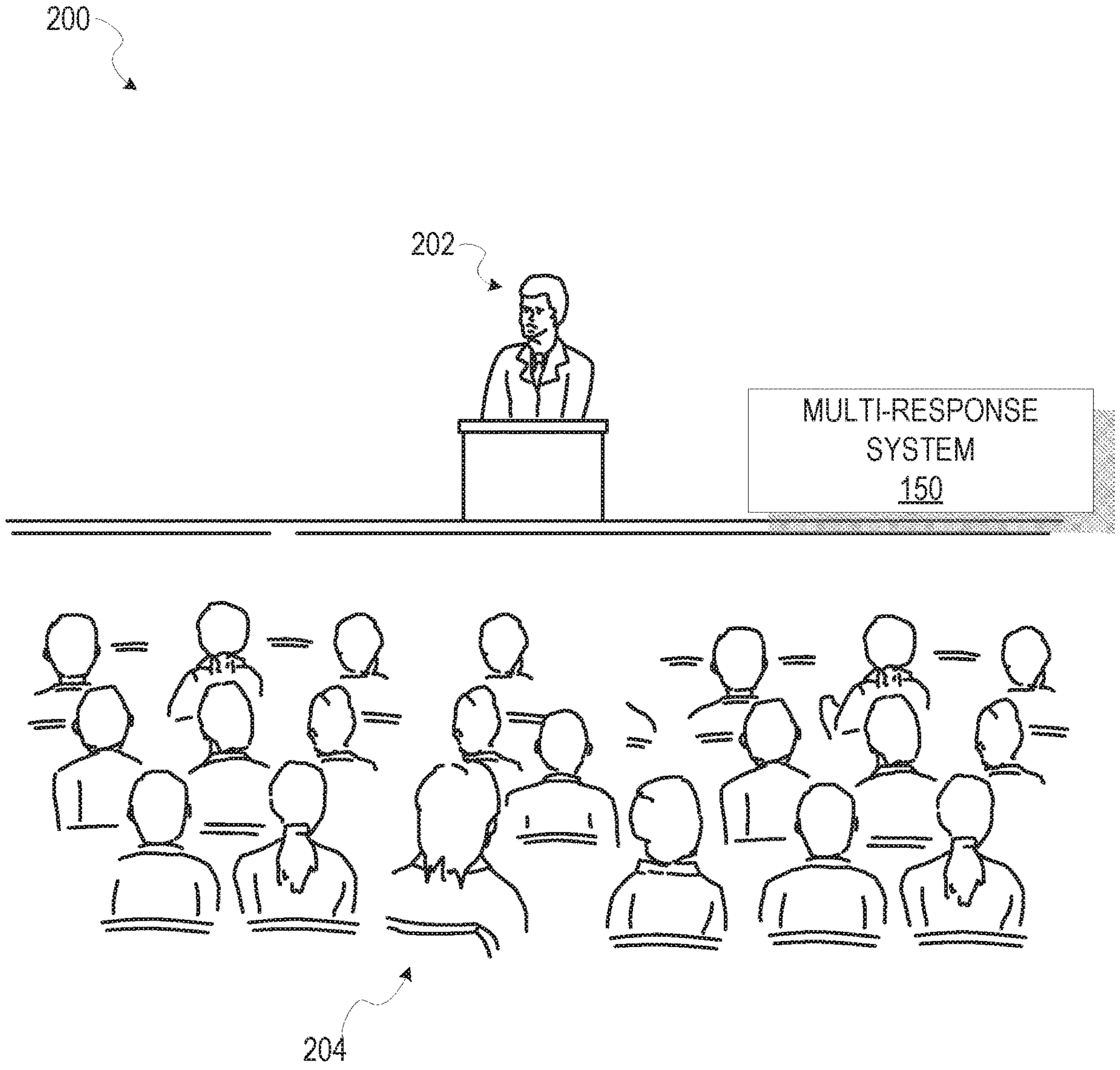
FIG. 2 is an illustration depicting one scenario, according to one example embodiment.

FIG. 2 is an illustration depicting a scenario 200 according to one example embodiment. According to this example embodiment, the multi-response system 150 is positioned in proximity to a crowd 204 of people listing to a speaker 202. At one point or another, the speaker 202 may request a response from the crowd 204.

In one example, an application server 140 is configured to track votes. The application server 140, in this example, instructs the multi-response system 150 to begin and end listening for audio responses from the crowd 204. The speaker 202 may then ask the crowd 204 to respond to a certain question within the beginning and ending time wherein the multi-response system 150 listens for responses from the crowd 204. The speaker 202 may request a yes/no response, a numerical response, or any other verbal response as will be further described After receiving concurrent responses from members of the crowd 204, the multi-response system 150 determines the various responses included in the audio signal. In one example, the multi-response system 150 identifies distinct tonal patterns included in the audio signal and extracts the distinct tonal patterns into individual audio signals. The distinct tonal patterns may include differing tone, magnitude, accentuation, pronunciation, and/or other vocal characteristics. The multi-response system 150 then performs voice recognition on each of the audio signals and determines responses accordingly.

In other examples, the multi-response system 150 determines a distinct voice, digitally subtracts the distinct voice from the audio signal and then searches for other distinct voices in the remaining audio signal until no other distinct voices are found. In one example, the multi-response system 150 includes magnitude of the distinct voices to differentiate one voice from another. In still other examples, the multi-response system 150 applies a neural network trained for vocal recognition. The multi-response system 150 may also employ signal subtraction, digital analysis, spectral analysis, polyphonic audio signal analysis, signal comparison, and/or other techniques for determining distinct responses included in an audio signal as one skilled in the art may appreciate.

After determining the distinct response included in the audio signal, the multi-response system 150 generates a crowd response for the two or more respondents, based on the concurrent responses. In certain non-limiting examples, the crowd response includes a majority vote, a popular opinion, a majority preference, a highest bid, a set of organized responses, a loudest response, or other, or the like as described herein.

In another example embodiment, the multi-response system 150 is located remotely, and an audio system records the audio signal and transmits the audio signal to the multi-response system 150 over a network, or any other transmission medium as one skilled in the art may appreciate. Similarly, the multi-response system 150 may receive audio signals from many audio systems concurrently, and processes the distinct audio signal serially.

In other examples, the multi-response system 150 determines a crowd response from members of a group poll, attendees at a workshop or seminar, a talk, religious gathering, political meeting, or other crowd of people.

Figure 3:
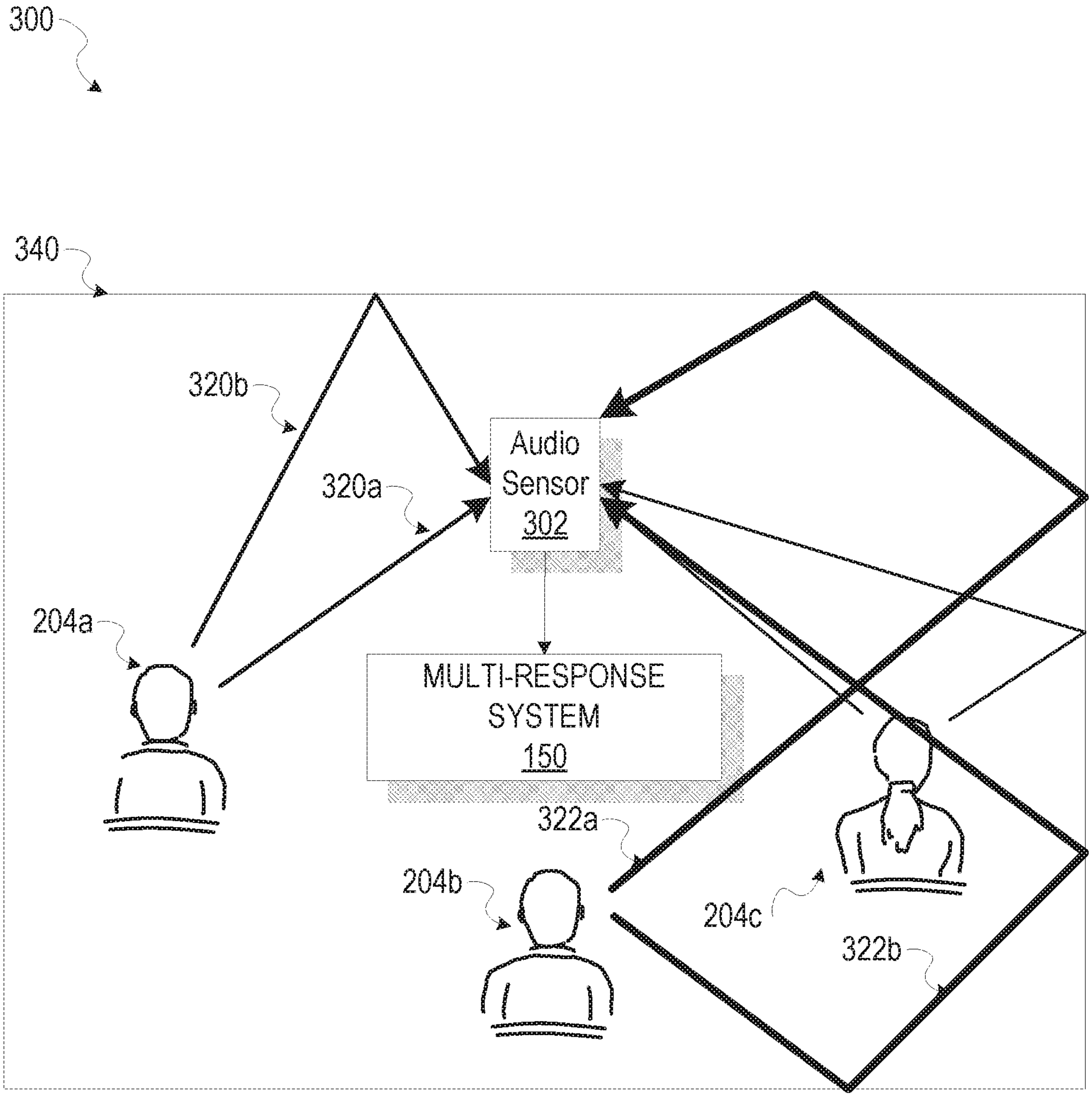
FIG. 3 is another illustrating depicting one scenario for determining a response of a crowd, according to one example embodiment.

FIG. 3 is another illustration depicting one scenario for determining a crowd response, according to one example embodiment. In this example embodiment, the multi-response system 150 is placed in a room with a crowd 204 and receives an audio signal from an audio sensor 302. The audio sensor 302 may or may not be substantially similar to the audio components depicted in FIG. 14.

The audio sensor 302, in this example embodiment, is configured to sense an audio signal by sensing variations in atmospheric pressure at the audio sensor 302. The audio sensor 302 senses vibrations in the air and generates an audio signal that represents the detected vibrations as one skilled in the art may appreciate.

In this example embodiment, the multi-response system 150 is configured to determine a location of a member of the crowd 204 based on duplicate vocal patterns included in the audio signal. In one example, the multi-response system 150 emits a known sound and listens for echoes to determine geometry of an enclosed space 340 as one skilled in the art may appreciate.

In one example embodiment, the multi-response system 150 detects a first version 320*a* of a vocal pattern originating at respondent 204*a* and a second version 320*b* of the vocal pattern after receiving the first version 320*a*. The multi-response system 150 determines that second version 320*b* is an echo of first version 320*a*, and subtracts the echo from the audio signal. The multi-response system 150 may also determine a location of the respondent 204*a* based on the time difference between different echoes and the known geometry of the enclosed space 340. Furthermore, the multi-response system 150 determines the location of respondent 204*b* based, at least in part, on vocal pattern version one 322*a* and an echo 322*b* of the vocal pattern version one 322*a*.

In another example embodiment, the audio sensor 302 may sense that the response from respondent 204*b* has a higher intensity or magnitude than the response from respondent 204*a*. As indicated in FIG. 3 by increased line width, the respective echo 322*b* also has a higher intensity or magnitude than the second version 320*b*. Thus the multi-response system 150 may determine a location of a respondent, such as respondent 204_b_, as well as the intensity of the respective responses from respondent 204_a_ and respondent 204_b_.

FIG. 4 is an illustration depicting one scenario for determining a crowd response from a crowd, according to an example embodiment. In this example embodiment, an auctioneer 402 auctions an item 420 to a crowd 404 of people.

In one example embodiment, the auctioneer 402 indicates a start time for bidding. The people in the crowd 404 call out their respective bids as the multi-response system 150 receives an audio signal that includes the bids. The multi-response system 150 then determines the individual bids by identifying vocal patterns correlating to specific members of the crowd 404 and determining spoken bids by the members as described herein and as one skilled in the art may appreciate. In another example embodiment, the multi-response system 150 also determines respective locations and cultural properties of each of the members of the crowd 404 that vocalized a bid. Therefore, in this example embodiment, the crowd response is the highest bid received and includes cultural properties of person speaking the highest bid.

In one example embodiment, the multi-response system 150 stores the cultural properties of the highest bidder, as well as properties of the item 420 being bid on, location, number of bidders, bid values, and any and/or all other properties of the item 420. Over times, as many auctions are held, the multi-response system 150 may generate historical bidding patterns for bidders of certain cultures. Such data output may assist an auctioneer 402 in determining starting bids for item based, at least in part, on the cultural properties of the bidders attending the auction.

In another example embodiment, the multi-response system 150 then determines a highest bid by comparing each of the received bids and outputs the location and cultural properties of the high bidder. Thus, the auctioneer 402 is presented with the high bid, the location of the high bidder and cultural properties of the high bidder. This allows the auctioneer 402 to quickly and easily identify the high bidder in the crowd 404.

In another example embodiment, a client device 110 operates as a member of the crowd 404 and generates a vocal bid. Thus, a remote person may, using the client device 110, place a vocal bid at the auction and the multi-response system 150 includes the bids in the respective determined distinct bids.

In this example embodiment, the multi-response system 150 does not identify the respective bidders. For example, the multi-response system 150 has not heard any of the distinct voices before the auction and has not been trained on any of the distinct voices.

In one example embodiment, the auctioneer 402 indicates a start time and end time for placing bids. A distinct member of the crowd 404 may vocalize several bids, and the multi-response system 150 determines a highest bid for the distinct member. In another example embodiment, the multi-response system 150 determines a first bid for the distinct member and ignores other bids vocalized by the distinct member.

For example, the multi-response system 150 determines the concurrent responses to be the values of the bids represented in FIG. 4. In this example, the multi-response system 150 determines the responses to be $390, $415, $465, and $425 respectively. The multi-response system 150 then determines that the highest bid is $465, and may also display the location and cultural properties of the bidder that voiced the highest bid.

In another example embodiment, the auctioneer 402 offers to sell the item 420 at a certain price, and the multi-response system 150 listens for responses. In response to determining that a member of the crowd indicated "yes," the multi-response system 150 determines the location and cultural characteristics of the person accepting the offer. In one example, the multi-response system 150 indicates the first person that accepted the offer. In this example embodiment, the crowd response includes an identification of the person accepting the offer. In one example embodiment, the multi-response system 150 determines that many members of the crowd indicated "yes," and indicates the respective locations and/or cultural properties of the members that indicated in the affirmative. Therefore, the multi-response system 150, in certain embodiments, supports a multi-participant marketplace of members shouting bids, accepting offers, or other, or the like.

Figure 5:
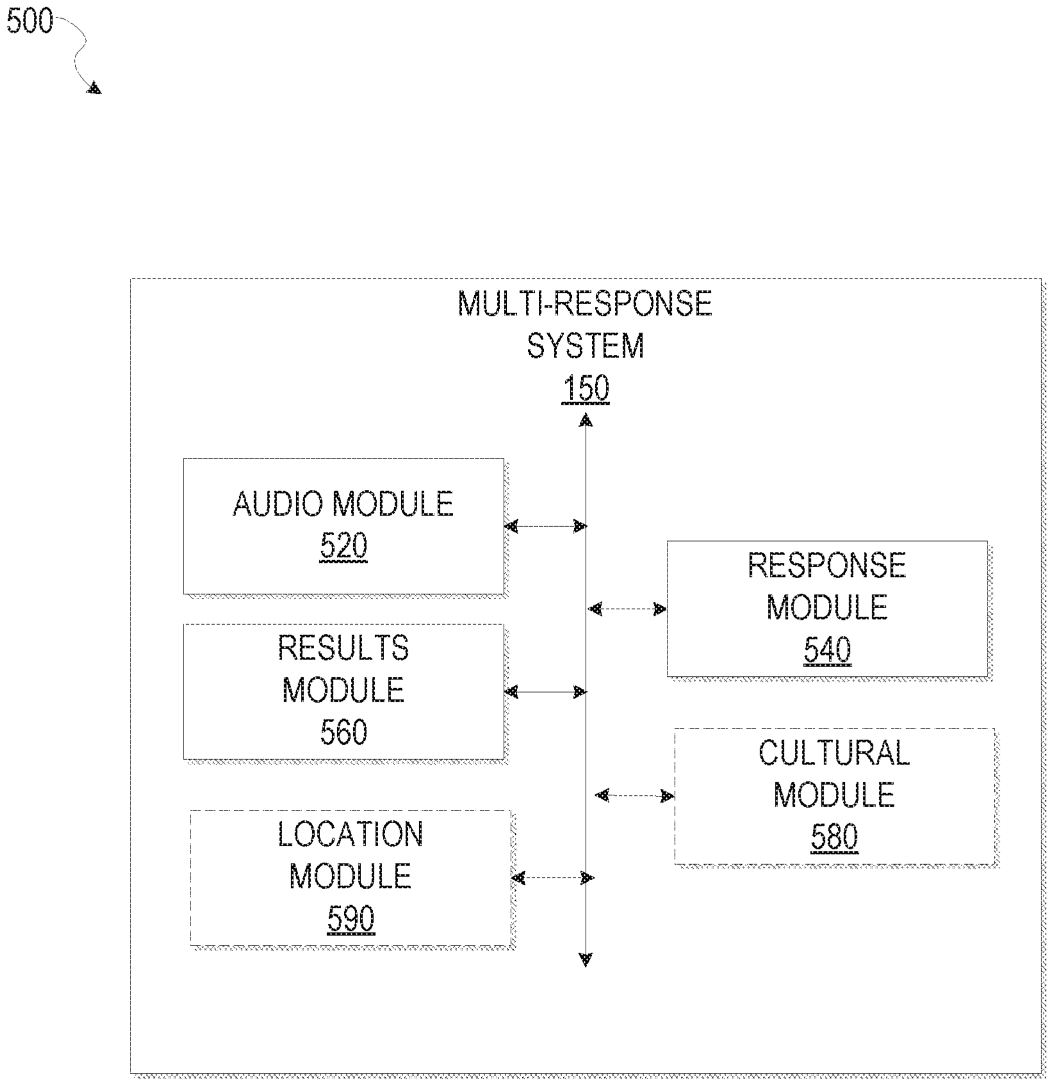
FIG. 5 is a block diagram illustrating an example embodiment of a system for determining a response of a crowd.

FIG. 5 is a block diagram 500 illustrating an example embodiment of a system for determining a crowd response from a crowd. In this example embodiment, the multi-response system 150 includes an audio module 520, a response module 540, and a results module 560. The cultural module 580 and the location module 590 are optional modules and may or may not be included in the multi-response system 150. Therefore, in another example embodiment, the multi-response system 150 also includes a cultural module 580 and a location module 590.

In one example embodiment, the audio module 520 is configured to receive an audio signal that includes concurrent responses from two or more respondents. In one embodiment, the audio module 520 receives the audio signal from an audio sensor (e.g., Audio I/O component 1450 of FIG. 14).

In another embodiment, the audio module 520 receives the audio signal over a network connection. For example, an audio sensor senses the responses, digitizes the audio and transmits a digital version of the audio signal to the audio module 520. Of course, one skilled in the art may recognize other ways in which the audio module 520 may receive an audio signal and this disclosure is not limited in this regard.

In another example embodiment, the response module 540 determines the concurrent responses from the audio signal without regard to the identity of the respondents. In this example embodiment, the response module 540 does not compare the concurrent responses with known voice patterns, but instead simply identifies distinct voices included in the audio signal and parses out the distinct concurrent responses regardless of the identity of the respondents.

In one example embodiment, the response module 540 determines one of the concurrent distinct responses in the audio signal, stores the response as a separate audio portion, and digitally subtracts the audio portion from the audio signal. The response module 540 may repeat these steps until no further distinct concurrent responses remain in the audio signal.

In another example embodiment, the response module 540 determines distinct voices by identifying distinct voices by matching tonality, sharpness, pronunciation, language, pitch, speed, volume, and/or other characteristics of a person's voice. In one example embodiment, the response module 540 applies a neural network trained for voice recognition. In other example embodiments, the response module 540 employs signal subtraction, digital analysis, spectral analysis, polyphonic signal analysis, signal comparison, and/or other audio signal manipulation strategies as one skilled in the art may appreciate.

In one example embodiment, the results module 560 generates a crowd response that represents a sentiment of the respondents, based on the concurrent responses. In one example, the results module 560 adds matching responses together and generates a crowd response that is consistent with the highest number of responses. In another example, the results module 560 generates a crowd response that is a value of a response with the highest value. In another example, the results module 560 generates a crowd response by determining the response with the lowest value and generates a response that equals the lowest valued response.

In another example embodiment, the results module 560 scores each of the distinct concurrent responses based on a volume, pitch, speed, or other vocal characteristic. In one example, the results module 560 places a higher weight to responses that are louder than other responses. In one example, the results module 560 assigns a score of 1.0 to each response, and then multiplies the score of each response by the magnitude for the response. Thus louder responses result in higher scores. The results module 560 may also aggregate the concurrent responses by adding the scores for responses with similar outcomes, and determining the response with the highest score. Of course, the results module 560 may use any other characteristic of a vocal pattern to adjust a score and this disclosure is not limited in this regard.

In one example embodiment, the response module 540 identifies a specific respondent and the results module 560 adjusts a score for a response based on the identity of the respondent. For example, the score for an administrator for a group of people may receive a higher score than members of the group.

In one example, in a business meeting, the results module 560 increases a score for a response that came from an officer of the business. In another example, the results module 560 multiplies the score for a respondent based on a level of the respondent in a hierarchal structure of members of the crowd.

In another example embodiment, the results module 560 generates a chart that includes each of the responses in the audio signal. The concurrent responses may be organized by response, time, magnitude, importance, speed, location, race, gender, accent, language, or any other characteristic of the vocal pattern and/or the response.

In one example embodiment, the cultural module 580 determines one or more cultural properties of a respondent based on a response included in the audio signal. The cultural property includes, but is not limited to, race, gender, age, accent, pronunciation, sentence structure, language, or other, or the like. In one specific example, gender specific tonal qualities are detected in the audio signal. In response, the cultural module 580 determines that the speaker is of one gender or another.

In another example embodiment, the cultural module 580 apportions the concurrent responses into cultural groups. One example of such an apportionment is depicted in FIG. 7. In one example, the cultural module 580 determines a cultural property by comparing the voice pattern with a known set of voice patterns. In response to the voice pattern matching a voice pattern from a specific cultural group, the cultural module 580 determines that the respondent that spoke the response is a member of the specific cultural group. In another example embodiment, the known set of voice patterns is according to a third party database of cultural patterns.

In one example embodiment, the location module 590 is configured to determine respective locations of the respondents. As previously described, the location may be determined using echo-location, echo analysis, or using any other location determination algorithm as one skilled in the art may appreciate.

In one example, the audio module 520 receives audio signals from several different audio sensors. For example, three microphones may be placed at known locations allowing the location module 590 to determine a source location for a voice as one skilled in the art may appreciate.

In another example embodiment, the location module 590 causes a speaker to emit a sound pulse, and the location module 590 listens for various echoes of the pulse to determine a geometry of a room, and uses the geometry to further determine locations of various voices occurring within the room as one skilled in the art may appreciate.

In one example embodiment of the multi-response system 150, the multi-response system 150 is placed in a grocery store, or other retail product outlet. A store manager may, over an audio system for the store, assess which coupons or other discounts the customers currently desire. The store manager may then command the multi-response system 150 to start tracking responses from the customers in the store. The multi-response system 150 then receives an audio signal that includes the responses of the customers, determines the distinct responses, and then generates a crowd response viewable by the store manager.

In one example, one customer shouts "Wonder Bread," while two other customers call out "Heinz Ketchup." As previously described, the multi-response system 150 may generate a response of "Heinz Ketchup" because a greater number of respondents indicated that product. In another example, the multi-response system 150 generates a response that includes each of the responses and generates a response for the store manager that includes both "Wonder Bread" and "Heinz Ketchup."

In another example embodiment, a choose-your-own-adventure movie is playing in a movie theater. As one skilled in the art may appreciate, the movie experience changes according to the interaction by the crowd. According to this example embodiment, the movie system that controls the movie poses the decision to the audience and commands the multi-response system 150 to listen for responses.

For example, the multi-response system 150 receives the audio signal that includes the responses, determines the distinct responses, and generates a crowd response that represents the audience. In one example, the generated response represents the most popular response. In another example, the generated response represents the loudest response by summing an amplitude for respondents indicating their preference. Of course, other metrics may be used as described herein. After receiving the generated response from the multi-response system 150, the movie system may command the multi-response system 150 to stop listening for responses.

In another example embodiment, the multi-response system 150 is placed at a display for a new product at a trade show. A presenter may request the audience to call out features they would like the product to be modified to include. The multi-response system 150 receives an audio signal that includes the responses, generates a crowd response based on the detected voices, and displays the crowd response to the presenter. In this example, the presenter receives either a most popular feature desired by the crowd, or a chart representing each distinct feature called out. Of course, the crowd response may be presented in any order, or in any other way, as one skilled in the art may appreciate.

In another example embodiment, the multi-response system 150 is used at a reality singing competition. After two competitors have sung their respective songs, an announcer asks the audience to vote for their favorite singer. The multi-response system 150 listens for the responses and generates a crowd response that indicates the singer with the most votes. In another example, the multi-response system 150 generates a chart of responses that includes cultural information for each of the respondents.

In another example embodiment, the multi-response system 150 operates a juke box. Periodically, the juke box may announce "Please request a song." The multi-response system 150 determines distinct responses included in an audio signal that includes the various responses. The multi-response system 150 then generates a crowd response that includes a song with the highest number of votes. The juke box may then play that song. This allows potential operators of the juke box to operate the juke box remotely without leaving their seats.

Figure 6:
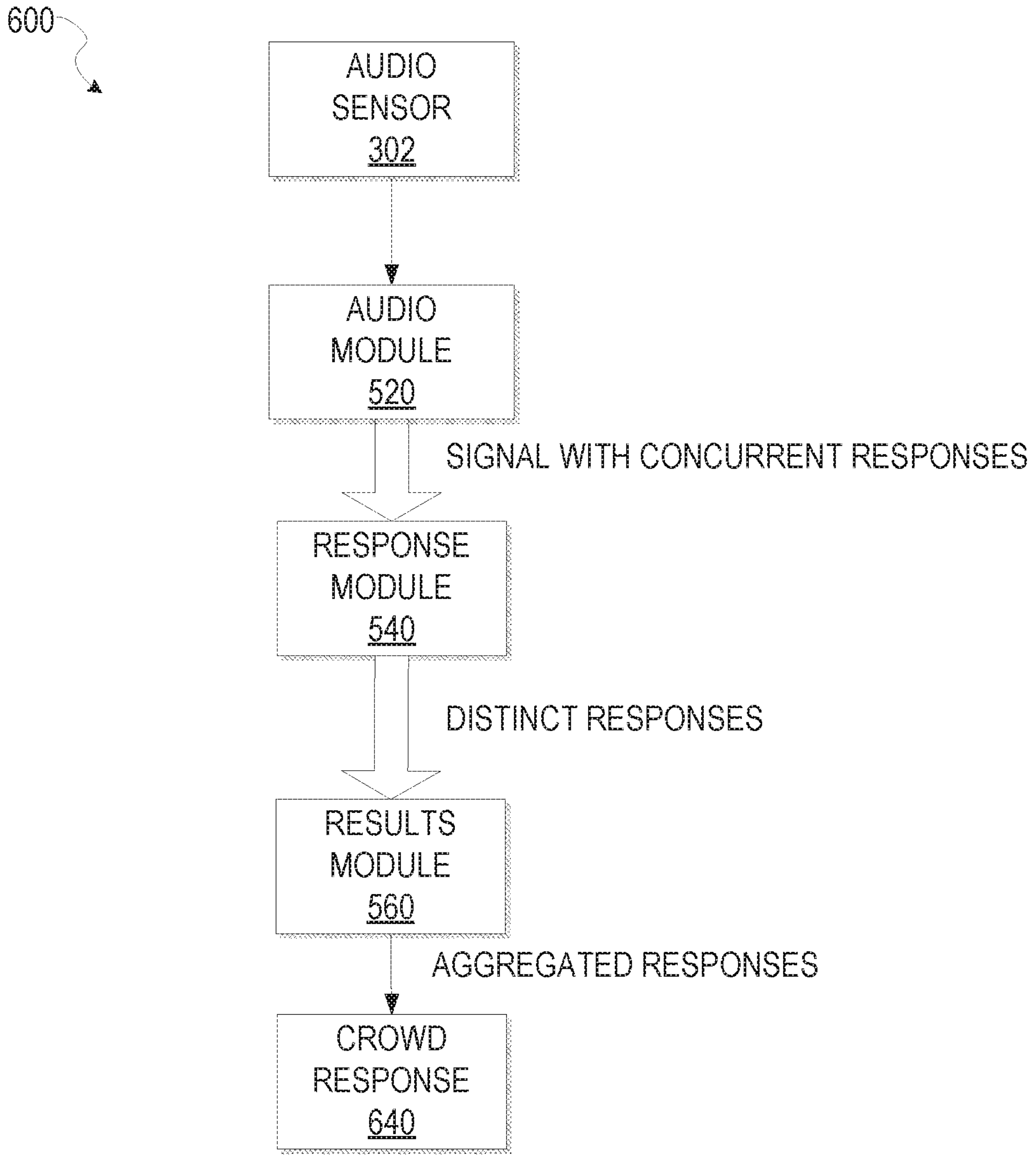
FIG. 6 is a flow diagram illustrating one data flow example for a system that determines a determining a response of a crowd, according to one embodiment.

FIG. 6 is a flow diagram 600 illustrating one data flow example for a system that determines a crowd response for a crowd, according to one embodiment. According to this embodiment, the audio sensor 302 senses audio that includes many concurrent responses. The audio module 520 receives the audio signal and transmits the audio signal to the response module 540. The response module 540 determines the distinct responses from the audio signal and transmits the distinct responses to the results module 560. In response, the results module 560 aggregates the distinct responses and generates a crowd response representing the distinct responses. The aggregated responses may be represented by a crowd response 640.

FIG. 7 is a chart depicting a crowd response 700 according to one example embodiment. In one example embodiment, a crowd response 702 generated by the results module 560 includes a yes or no response. For example, the concurrent responses may include 14 "yes" responses and 8 "no" responses. Accordingly, the results module 560 determines that the response that represents most of the respondents is "yes."

In another example embodiment, in a breakdown 704 the cultural module 580 determines that four of the responses are from Caucasians, eight of the responses are from African Americans, and 10 of the responses are from Asians. The cultural module 580 may also divide the respective responses for each group indicating yes/no responses for each group as depicted in FIG. 7.

FIG. 8 is another chart 800 depicting a crowd response according to one example embodiment. In one example embodiment, the chart 800 indicates responses from members of a crowd. In response to being asked which song the crowd prefers, distinct members of the crowd speak their answers.

The audio module 520 receives an audio signal that includes the responses, and the response module 540 determines the distinct responses based on the audio signal. In this example embodiment, the results module 560 determines that eight members of the crowd indicated "SONG A," two members of the crowd indicated "SONG B," and one member of the crowd indicated "SONG C." Also, the results module 560 may generate a crowd response indicating "SONG A" because "SONG A" included the most number of responses from the members of the crowd.

In another example embodiment, the chart also includes a breakdown 804 of the responses from the members of the crowd. In this example embodiment, the breakdown 804 includes each response from members of the crowd as indicated in FIG. 8. In one example, the breakdown 804 includes each distinct response from the respondents and indicates a number of respondents that indicated each distinct response. In another example, the breakdown 804 includes each response from the crowd of respondents.

Figure 9:
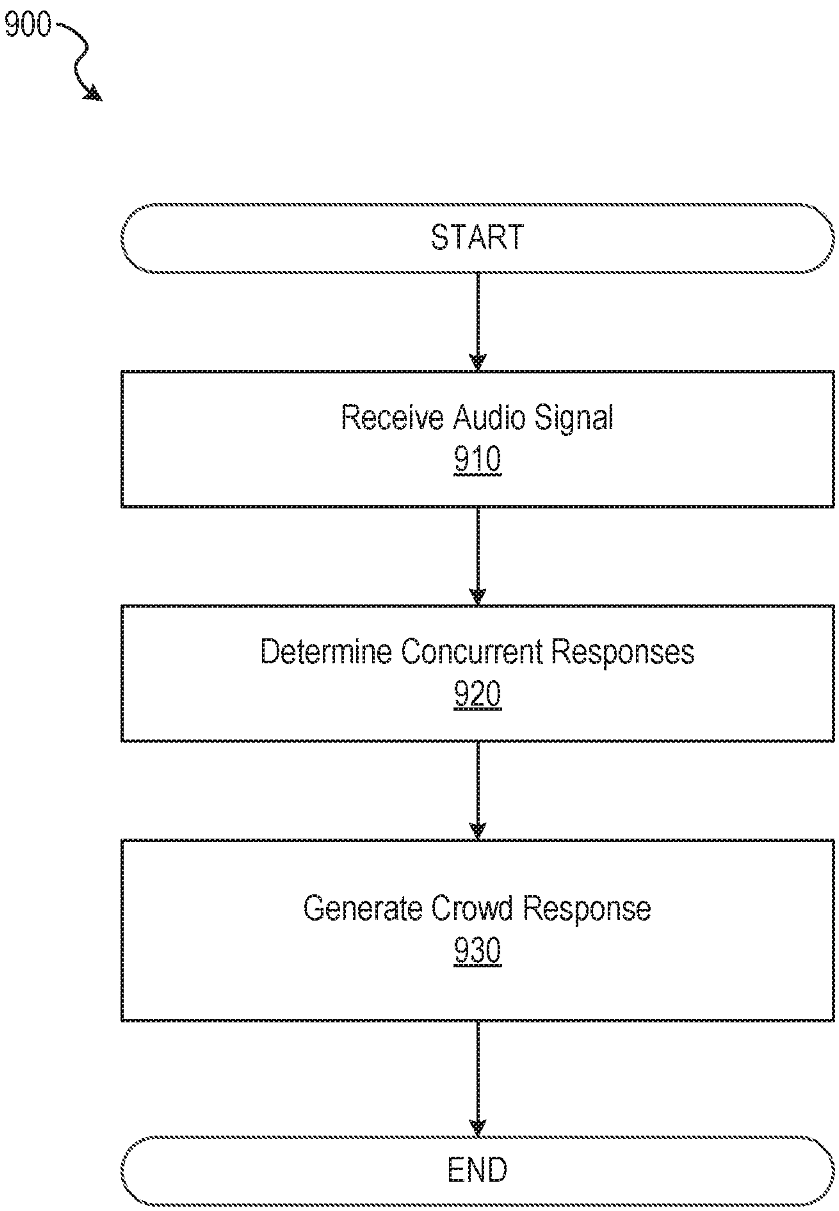
FIG. 9 is a flow diagram illustrating a method for determining a determining a response of a crowd, according to one example embodiment.

FIG. 9 is a flow diagram illustrating a method 900 for determining a crowd response for a crowd, according to one example embodiment. Operations in the method 900 may be performed by the multi-response system 150, using modules described above with respect to FIG. 5. As shown in FIG. 9, the method 900 includes operations 910, 920, and 930.

The method 900 begins and at operation 910, the audio module 520 receives an audio signal that includes concurrent responses from two or more respondents. The method 900 continues at operation 920 and the response module 540 determines the concurrent responses from the audio signal without regard to the identity of the respondents. In one specific, non-limiting example, the response module 540 employs signal subtractions, spectral analysis, and/or any other audio manipulation technique, or to be developed technique as one skilled in the art may appreciate. The method 900 continues at operation 930 and the results module 560 generates a crowd response that represents a sentiment of the two or more respondents, based on the concurrent responses.

Figure 10:
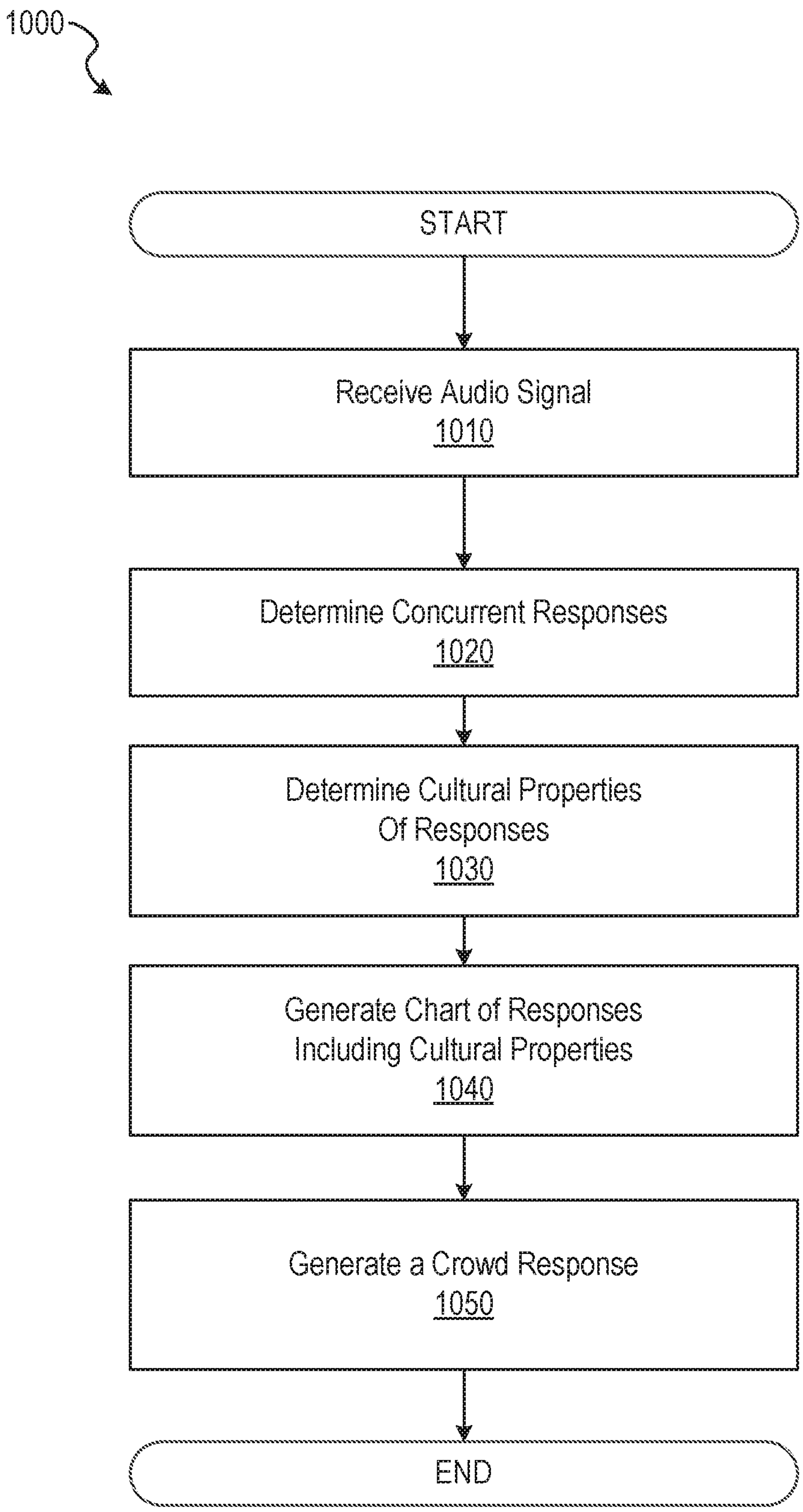
FIG. 10 is a flow diagram illustrating another method for determining a response of a crowd, according to one example embodiment.

FIG. 10 is a flow diagram illustrating another method 1000 for determining a crowd response for a crowd, according to one example embodiment. Operations in the method 1000 may be performed by the multi-response system 150, using modules described above with respect to FIG. 5. As shown in FIG. 10, the method 1000 includes operations 1010, 1020, 1030, 1040, and 1050.

The method 1000 begins and at operation 1010, the audio module 520 receives an audio signal that includes concurrent responses from two or more respondents. The method 1000 continues at operation 1020 and the response module 540 determines the concurrent responses from the audio signal without regard to the identity of the respondents.

The method 1000 continues at operation 1030 and the cultural module 580 determines cultural properties of one or more of the respondents. As previously described, the cultural properties include at least one of, but are not limited to, race, accent, country, language, and cultural region. The method 1000 continues at operation 1040 and the results module 560 generates a chart of responses that includes the cultural properties of the respondents. The method 1000 continues at operation 1050 and the results module 560 generates a crowd response that represents the responses included in the audio signal.

In one specific example, the response module 540 determines that a pronunciation of the term "aboot" indicates a northern American pronunciation of the term "about." In another example, a member speaking "soda" may be associated with a different region as a similar member indicating "pop." Based, at least in part, on a database of speaking patterns, habits, or other vocal characteristics, the response module 540 determines cultural properties of the member speaking the response.

Figure 11:
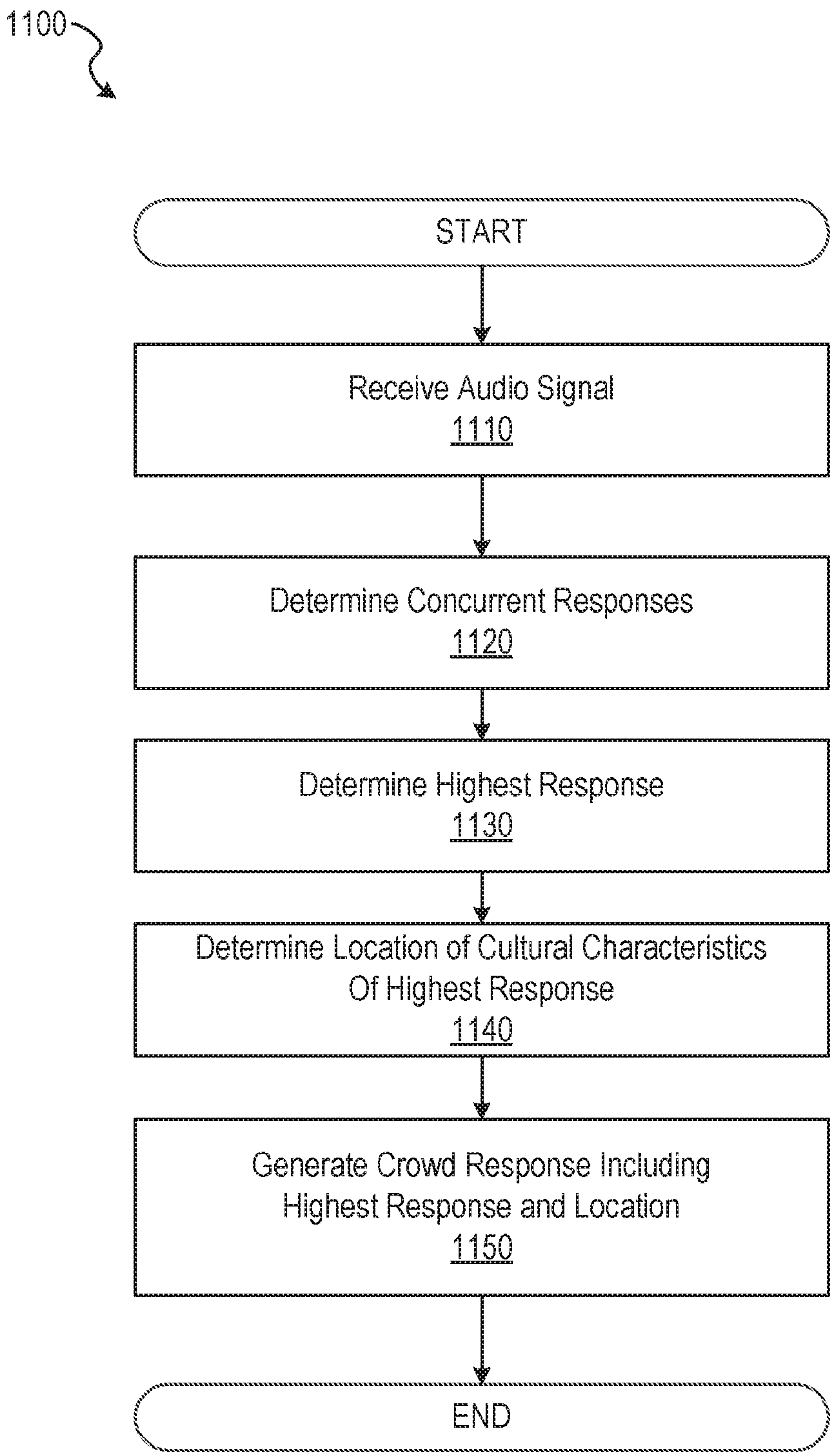
FIG. 11 is a flow diagram illustrating another method for determining a response of a crowd, according to one example embodiment.

FIG. 11 is a flow diagram illustrating another method 1100 for determining a crowd response from a crowd, according to one example embodiment. Operations in the method 1100 may be performed by the multi-response system 150, using modules described above with respect to FIG. 5. As shown in FIG. 11, the method 1100 includes operations 1110, 1120, 1130, 1140, and 1150.

The method 1100 begins and at operation 1110, the audio module 520 receives an audio signal that includes concurrent responses from two or more respondents. The method 1100 continues at operation 1120 and the response module 540 determines the concurrent responses from the audio signal without regard to the identity of the respondents. The method 1100 continues at operation 1130 and the results module 560 determines a highest response from the respondents. In one example, the audio module 520 employs a simple cardinal numbering detection with the highest numerical value being the highest response. In one embodiment of the method 1100, the concurrent responses are bids at a live auction, and the highest response is the highest bid.

The method 1100 continues at operation 1140 and the location module 590 determines the location of the respondent that spoke the highest response. In one example, the highest respondent vocalized a highest bid at an auction and the location module 590 determines the location of the highest bidder. Also at operation 1140, the cultural module 580 determines cultural characteristics of the high bidder. The method 1100 continues at operation 1150 and the results module 560 generates a crowd response that includes the location and cultural characteristics of the high bidder.

Figure 12:
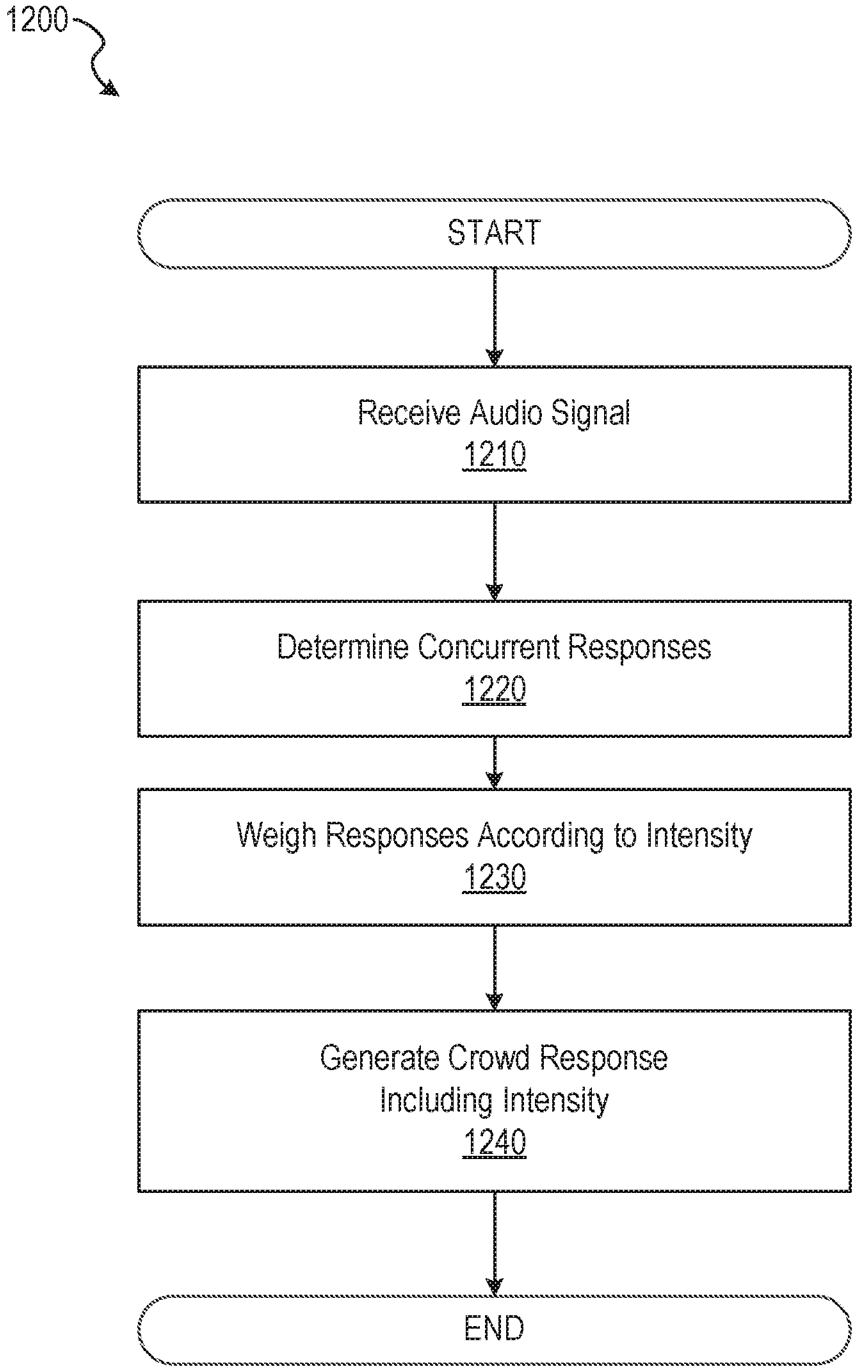
FIG. 12 is a flow diagram illustrating another method for determining a response of a crowd, according to one example embodiment.

FIG. 12 is a flow diagram illustrating another method 1200 for determining a crowd response for a crowd, according to one example embodiment. Operations in the method 1200 may be performed by the multi-response system 150, using modules described above with respect to FIG. 5. As shown in FIG. 12, the method 1200 includes operations 1210, 1220, 1230, and 1240.

The method 1200 begins and at operation 1210, the audio module 520 receives an audio signal that includes concurrent responses from two or more respondents. The method 1200 continues at operation 1220 and the response module 540 determines the concurrent responses from the audio signal without regard to the identity of the respondents.

The method 1200 continues at operation 1230 and the results module 560 weighs the concurrent responses according to their respective intensities. In one example, the results module 560 determines an amplitude of the audio signal or aggregate waveforms and calculates the weight using the amplitude.

The method 1200 continues at operation 1240 and the results module 560 generates a crowd response representing the response with the highest intensity. In another example embodiment, the results module 560 sums respective intensities for similar responses and generates the response that represents the single response with the highest summed intensity.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 5-12 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here as those of skill in the art can readily understand how to implement the inventive subject matter in different contexts from the disclosure contained herein.

Software Architecture

Figure 13:
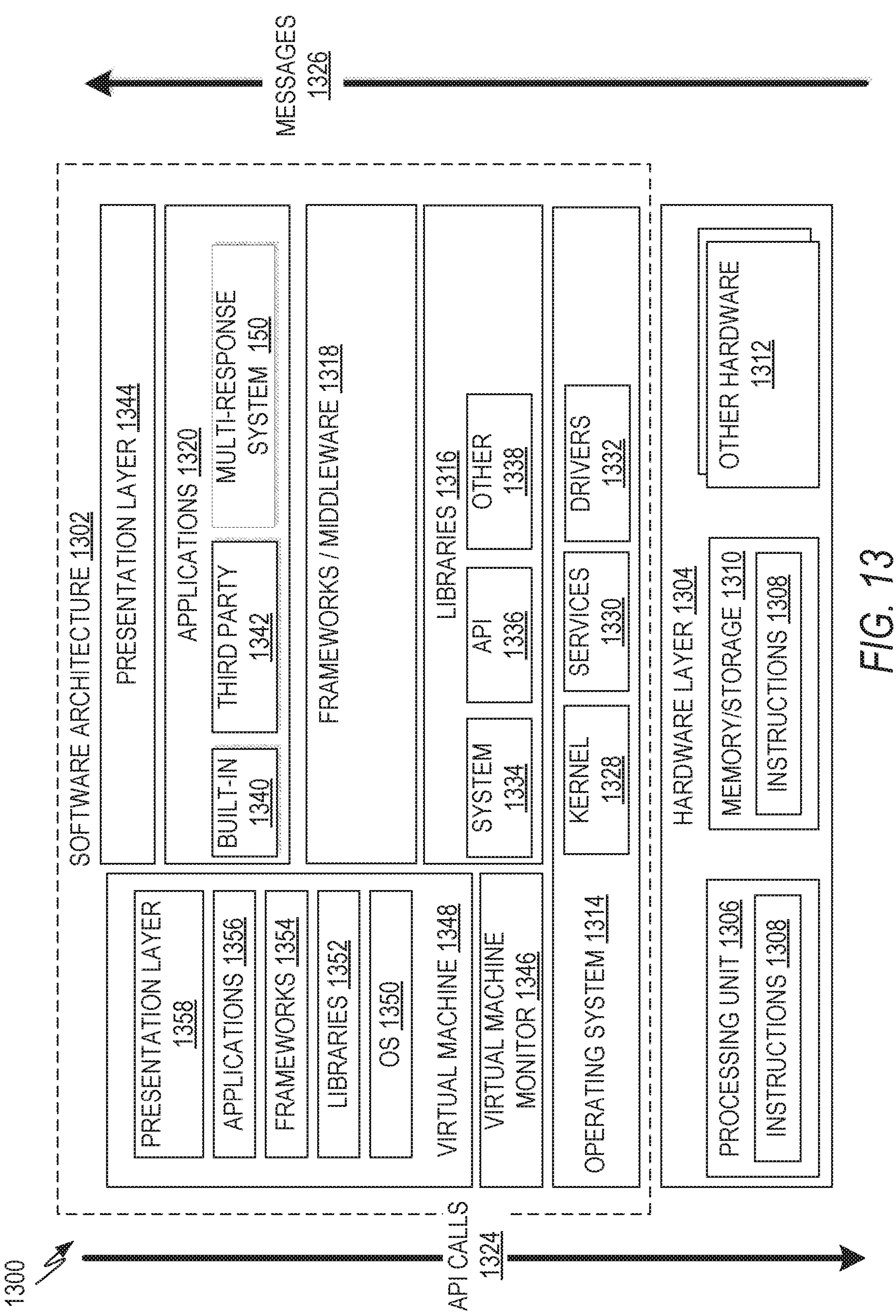
FIG. 13 is a block diagram illustrating an example of a software architecture that may be installed on a machine, according to some example embodiments.

FIG. 13 is a block diagram 1300 illustrating a representative software architecture 1302, which may be used in conjunction with various hardware architectures herein described. FIG. 13 is merely a non-limiting example of a software architecture and it will be appreciated that many other architectures may be implemented to facilitate the functionality described herein. The software architecture 1302 may be executing on hardware such as machine 1400 of FIG. 14 that includes, among other things, processors 1410, memory/storage 1430, and I/O components 1450. A representative hardware layer 1304 is illustrated and can represent, for example, the machine 1400 of FIG. 14. The representative hardware layer 1304 comprises one or more processing units 1306 having associated executable instructions 1308. Executable instructions 1308 represent the executable instructions of the software architecture 1302, including implementation of the methods, modules and so forth of FIGS. 5-12. Hardware layer 1304 also includes memory and/or storage modules 1310, which also have executable instructions 1308. Hardware layer 1304 may also comprise other hardware as indicated by 1312 which represents any other hardware of the hardware layer 1304, such as the other hardware illustrated as part of machine 1400.

In the example architecture of FIG. 13, the software architecture 1302 may be conceptualized as a stack of layers where each layer provides particular functionality. For example, the software architecture 1302 may include layers such as an operating system 1314, libraries 1316, frameworks/middleware 1318, applications 1320 and presentation layer 1344. Operationally, the applications 1320 and/or other components within the layers may invoke application programming interface (API) calls 1324 through the software stack and receive a response, returned values, and so forth illustrated as messages 1326 in response to the API calls 1324. The layers illustrated are representative in nature and not all software architectures have all layers. For example, some mobile or special purpose operating systems may not provide a frameworks/middleware 1318 layer, while others may provide such a layer. Other software architectures may include additional or different layers.

The operating system 1314 may manage hardware resources and provide common services. The operating system 1314 may include, for example, a kernel 1328, services 1330, and drivers 1332. The kernel 1328 may act as an abstraction layer between the hardware and the other software layers. For example, the kernel 1328 may be responsible for memory management, processor management (e.g., scheduling), component management, networking, security settings, and so on. The services 1330 may provide other common services for the other software layers. The drivers 1332 may be responsible for controlling or interfacing with the underlying hardware. For instance, the drivers 1332 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1316 may provide a common infrastructure that may be utilized by the applications 1320 and/or other components and/or layers. The libraries 1316 typically provide functionality that allows other software modules to perform tasks in an easier fashion than to interface directly with the underlying operating system 1314 functionality (e.g., kernel 1328, services 1330 and/or drivers 1332). The libraries 1316 may include system libraries 1334 (e.g., C standard library) that may provide functions such as memory allocation functions, string manipulation functions, mathematic functions, and the like. In addition, the libraries 1316 may include API libraries 1336 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1316 may also include a wide variety of other libraries 1338 to provide many other APIs to the applications 1320 and other software components/modules.

The frameworks/middleware 1318 layer (also sometimes referred to as middleware) may provide a higher-level common infrastructure that may be utilized by the applications 1320 and/or other software components/modules. For example, the frameworks/middleware 1318 may provide various graphic user interface (GUI) functions, high-level resource management, high-level location services, and so forth. The frameworks/middleware 1318 may provide a broad spectrum of other APIs that may be utilized by the applications 1320 and/or other software components/modules, some of which may be specific to a particular operating system or platform.

The applications 1320 include built-in applications 1340 and/or third party applications 1342. Examples of representative built-in applications 1340 may include, but are not limited to, a contacts application, a browser application, a book reader application, a location application, a media application, a messaging application, and/or a game application. Third party applications 1342 may include any of the built-in applications 1340 as well as a broad assortment of other applications. In a specific example, the third party application 1342 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1342 may invoke the API calls 1324 provided by the mobile operating system, such as operating system 1314, to facilitate functionality described herein.

The applications 1320 may utilize built-in operating system functions (e.g., kernel 1328, services 1330 and/or drivers 1332), libraries (e.g., system libraries 1334, API libraries 1336, and other libraries 1338), frameworks/middleware 1318 to create user interfaces to interact with users of the system. Alternatively, or additionally, in some systems, interactions with a user may occur through a presentation layer, such as presentation layer 1344. In these systems, the application/module "logic" can be separated from the aspects of the application/module that interact with a user.

In one example embodiment, the multi-response system 150 is implemented as an application. In another example, each of the modules of the multi-response system 150 are implemented as one or more applications that communicate with each other as described in FIG. 6.

In one example embodiment, any of the modules depicted in FIG. 5 communicate with one or more libraries to perform their respective functions. In one example, the audio module 520 communicates with an audio library to receive an audio signal. In another example, the response module 540 communicates with an audio processing library to parse out distinct responses included in the audio signal. In one example, the results module 560 communicates with a graphical library to generate one or more charts as described herein. In another example, the cultural module 580 communicates with a cultural library to determine cultural characteristics of an audio response. In one example, the library also includes a database of cultural characteristics, such as, but not limited to, pre-defined accents, pre-defined cultural regions, languages, vocal pattern models, or other, or the like.

Some software architectures utilize virtual machines. In the example of FIG. 13, this is illustrated by virtual machine 1348. A virtual machine creates a software environment where applications/modules can execute as if they were executing on a hardware machine (such as the machine 1400 of FIG. 14, for example). A virtual machine is hosted by a host operating system (operating system 1314 in FIG. 13) and typically, although not always, has a virtual machine monitor 1346, which manages the operation of the virtual machine as well as the interface with the host operating system (i.e., operating system 1314). A software architecture executes within the virtual machine 1348 such as an operating system 1350, libraries 1352, frameworks/middleware 1354, applications 1356 and/or presentation layer 1358. These layers of software architecture executing within the virtual machine 1348 can be the same as corresponding layers previously described or may be different.

Example Machine Architecture and Machine-Readable Medium

Figure 14:
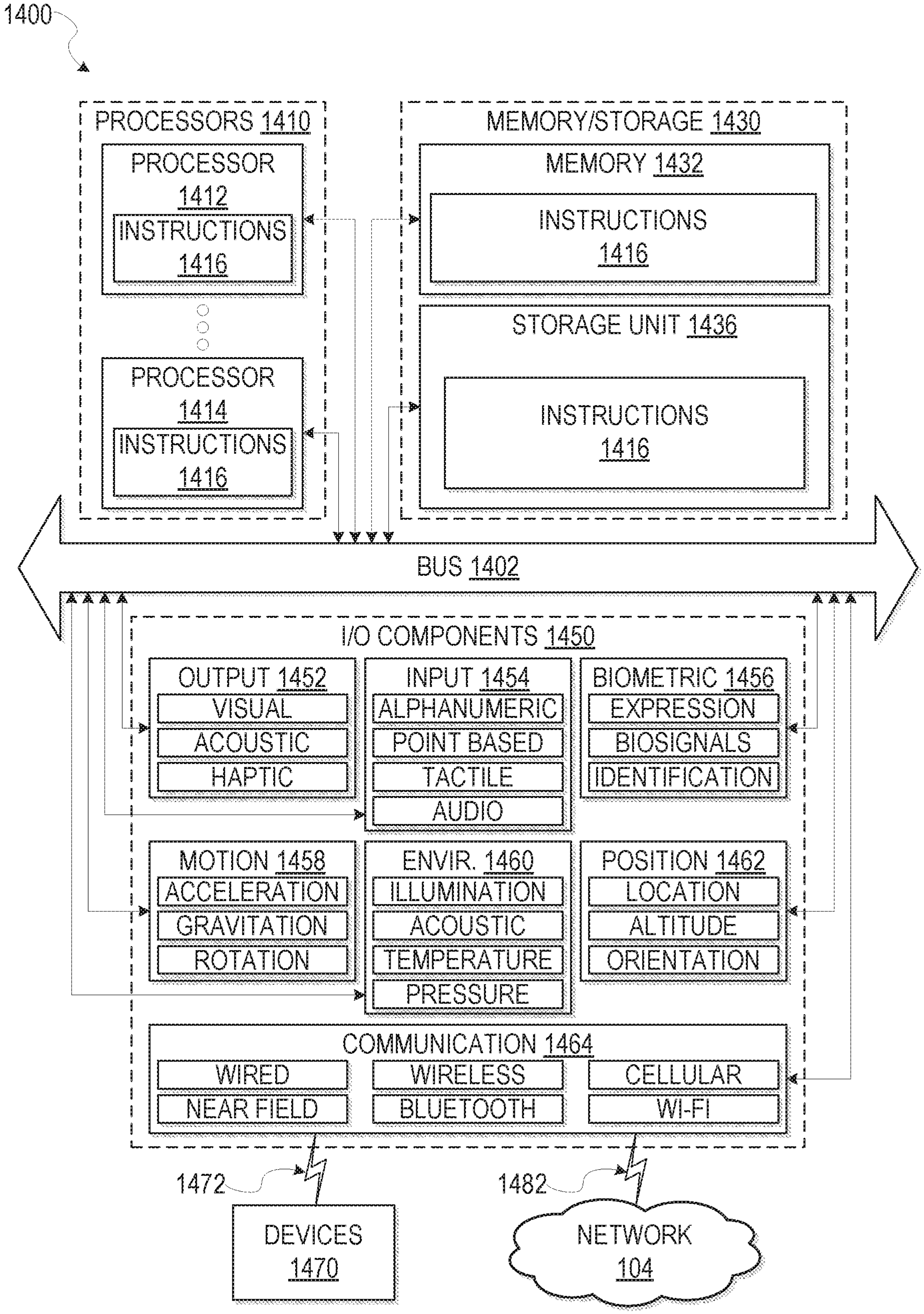
FIG. 14 illustrates a diagrammatic representation of a machine in the form of a computer system within which a set of instructions may be executed for causing the machine to perform any one or more of the methodologies discussed herein, according to an example embodiment.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. For example the instructions 1416 may cause the machine 1400 to execute the flow diagrams of FIGS. 9-12. Additionally, or alternatively, the instructions 1416 may implement the audio module 520, the response module 540, the results module 560, the location module 590, and/or the cultural module 580 of FIG. 5, and so forth. The instructions 1416 transform the general, non-programmed machine into a particular machine programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 may include processors 1410, memory 1430, and I/O components 1450, which may be configured to communicate with each other such as via a bus 1402. In an example embodiment, the processors 1410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1412 and processor 1414 that may execute instructions 1416. The term "processor" is intended to include a multi-core processor that may comprise two or more independent processors (sometimes referred to as "cores") that may execute instructions contemporaneously. Although FIG. 14 shows multiple processors 1410, the machine 1400 may include a single processor with a single core, a single processor with multiple cores (e.g., a multi-core processor), multiple processors with a single core, multiple processors with multiples cores, or any combination thereof.

The memory/storage 1430 may include a memory 1432, such as a main memory, or other memory storage, and a storage unit 1436, both accessible to the processors 1410 such as via the bus 1402. The storage unit 1436 and memory 1432 store the instructions 1416 embodying any one or more of the methodologies or functions described herein. The instructions 1416 may also reside, completely or partially, within the memory 1432, within the storage unit 1436, within at least one of the processors 1410 (e.g., within the processor's cache memory), or any suitable combination thereof, during execution thereof by the machine 1400. Accordingly, the memory 1432, the storage unit 1436, and the memory of processors 1410 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 1416. The term "machine-readable medium" shall also be taken to include any medium, or combination of multiple media, that is capable of storing instructions (e.g., instructions 1416) for execution by a machine (e.g., machine 1400), such that the instructions, when executed by one or more processors of the machine 1400 (e.g., processors 1410), cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1450 may include a wide variety of components to receive input, provide output, produce output, transmit information, exchange information, capture measurements, and so on. The specific I/O components 1450 that are included in a particular machine will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In one example embodiment, the results module 560 outputs a generated chart to one of the output components 1452. In another example, the audio module 520 receives an audio signal from an audio input component 1454. In one example, the audio module 520 receives the audio signal over the network 104 via any communication component 1464.

In further example embodiments, the I/O components 1450 may include biometric components 1456, motion components 1458, environmental components 1460, or position components 1462 among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 may include acceleration sensor components (e.g., accelerometer), gravitation sensor components, rotation sensor components (e.g., gyroscope), and so forth. The environmental components 1460 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1462 may include location sensor components (e.g., a Global Position System (GPS) receiver components), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 104 or devices 1470 via coupling 1482 and coupling 1472 respectively. For example, the communication components 1464 may include a network interface component or other suitable device to interface with the network 104. In further examples, communication components 1464 may include wired communication components, wireless communication components, cellular communication components, Near Field Communication (NEC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a Universal Serial Bus (USB)).

Moreover, the communication components 1464 may detect identifiers or include components operable to detect identifiers. For example, the communication components 1464 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1464, such as location via Internet Protocol (IP) geo-location, location via Wi-Fi® signal triangulation, location via detecting an NFC beacon signal that may indicate a particular location, and so forth.

Transmission Medium

In various example embodiments, one or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 104 or a portion of the network 104 may include a wireless or cellular network and the coupling 1482 may be a Code Division Multiple Access (CDMA) connection, a Global System for Mobile communications (GSM) connection, or other type of cellular or wireless coupling. In this example, the coupling 1482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1416 may be transmitted or received over the network 104 using a transmission medium via a network interface device (e.g., a network interface component included in the communication components 1464) and utilizing any one of a number of well-known transfer protocols (e.g., hypertext transfer protocol (HTTP)). Similarly, the instructions 1416 may be transmitted or received using a transmission medium via the coupling 1472 (e.g., a peer-to-peer coupling) to devices 1470. The term "transmission medium" shall be taken to include any intangible medium that is capable of storing, encoding, or carrying instructions 1416 for execution by the machine 1400, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system for processing an audio signal having concurrent responses of two or more respondents, the system comprising:

one or more processors and executable instructions accessible on a non-transitory computer-readable medium that, when executed, configure the one or more processors to perform operations comprising:

receiving, from an audio sensor, the audio signal that includes the concurrent responses from the two or more respondents;

receiving input that defines a beginning time and an ending time to track votes;

processing a portion of the audio signal that includes the concurrent responses between the beginning time and the ending time defined by the input;

separating the portion of the audio signal into two or more distinct audio signals;

determining a concurrent response of each respondent by performing voice recognition on each of the two or more distinct audio signals separated from the portion of the audio signal, the concurrent responses indicating a plurality of audio signal intensities;

determining that a given one of the two or more respondents is associated with a given cultural group in response to detecting that a voice pattern of the given one of the two or more respondents matches a given voice pattern of the given cultural group;

summing two or more of the plurality of audio signal intensities associated with a first response type of the concurrent responses to generate a summed audio signal intensity of the first response type; and causing a crowd response to be displayed on a user interface associated with the system based on the concurrent responses, determining that the given one of the two or more respondents is associated with the given cultural group, and the summed audio signal intensity of the first response type, wherein the crowd response indicates the first response type.

2. The system of claim 1, wherein the operations further comprise:

storing, in a database, a plurality of voice patterns associated with a plurality of cultural groups, wherein the plurality of voice patterns includes the given voice pattern and the plurality of cultural groups includes the given cultural group, a first voice pattern of the plurality of voice patterns being associated with a first cultural group of the plurality of cultural groups, and a second voice pattern of the plurality of voice patterns being associated with a second cultural group of the plurality of cultural groups.

3. The system of claim 2, wherein the plurality of cultural groups is based on at least one of race, accent, country, or cultural region.

4. The system of claim 1, wherein the operations further comprise:

aggregating a first number indicating how many of the concurrent responses in the audio signal include a first word and aggregating a second number indicating how many of the concurrent responses in the audio signal include a second word, wherein the two or more respondents are customers in a store; and assessing which coupons or discounts the customers in a store desire based on the crowd response.

5. The system of claim 1, wherein the operations further comprise:

determining a level of the given one of the two or more respondents in a hierarchal structure of members of a crowd; and computing a score for the given one of the two or more respondents based on the determined level.

6. The system of claim 5, wherein the hierarchal structure comprises a business and the determining the level comprises determining that a response of the given one of the two or more respondents came from an officer in the business, and wherein the operations further comprise causing a user interface to display the response of each respondent in a chart of responses.

7. The system of claim 1, wherein the operations further comprise:

weighing an intensity of a concurrent response of at least one respondent;

modifying a weight of the concurrent response of the at least one respondent based on the intensity;

using the weight of the concurrent response of the at least one respondent to determine a crowd response; and identifying one or more product features to modify based on the crowd response.

8. The system of claim 1, wherein a first concurrent response in the audio signal includes a first bid at a live auction, and wherein a second concurrent response in the audio signal that is received concurrently with the first concurrent response includes a second bid at the live auction, and wherein a crowd response represents a high bid for the live auction.

9. The system of claim 1, wherein the operations further comprise:

determining a location of the given one of the two or more respondents; and displaying the determined location and the given cultural group.

10. The system of claim 1, wherein the two or more respondents are audience members in a competition, and wherein the operations further comprise identifying a competitor from a plurality of competitors in the competition with a greatest number of votes based on a crowd response.

11. The system of claim 1, wherein the operations further comprise:

determining an intensity of the concurrent response of each respondent; and identifying one or more product features to modify based on the crowd response.

12. A method comprising:

receiving, by one or more processors, from an audio sensor, an audio signal that includes concurrent responses from two or more respondents;

receiving input that defines a beginning time and an ending time to track votes;

processing a portion of the audio signal that includes the concurrent responses between the beginning time and the ending time defined by the input;

separating, by the one or more processors, the portion of the audio signal into two or more distinct audio signals;

determining, by the one or more processors, a concurrent response of each respondent by performing voice recognition on each of the two or more distinct audio signals separated from the portion of the audio signal, the concurrent responses indicating a plurality of audio signal intensities;

determining, by the one or more processors, that a given one of the two or more respondents is associated with a given cultural group in response to detecting that a voice pattern of the given one of the two or more respondents matches a given voice pattern of the given cultural group;

summing two or more of the plurality of audio signal intensities associated with a first response type of the concurrent responses to generate a summed audio signal intensity of the first response type; and causing a crowd response to be displayed on a user interface associated with the one or more processors based on the concurrent responses, determining that the given one of the two or more respondents is associated with the given cultural group, and the summed audio signal intensity of the first response type, wherein the crowd response indicates the first response type.

13. The method of claim 12, the method further comprises:

storing, in a database, a plurality of voice patterns associated with a plurality of cultural groups, wherein the plurality of voice patterns includes the given voice pattern and the plurality of cultural groups includes the given cultural group, a first voice pattern of the plurality of voice patterns being associated with a first cultural group of the plurality of cultural groups, and a second voice pattern of the plurality of voice patterns being associated with a second cultural group of the plurality of cultural groups.

14. The method of claim 13, further comprising:

aggregating a first number indicating how many of the concurrent responses in the audio signal include a first word and aggregating a second number indicating how many of the concurrent responses in the audio signal include a second word, and wherein the two or more respondents are customers in a store; and assessing which coupons or discounts the customers in a store desire based on the crowd response.

15. The method of claim 12, further comprising:

determining a level of the given one of the two or more respondents in a hierarchal structure of members of a crowd; and computing a score for the given one of the two or more respondents based on the determined level.

16. The method of claim 15, wherein the hierarchal structure comprises a business and the determining the level comprises determining that a response of the given one of the two or more respondents came from an officer in the business, the method further comprising causing a user interface to display the response of each respondent in a chart of responses.

17. A non-transitory machine-readable storage medium comprising instructions that, when executed by one or more processors of a machine, cause the machine to perform operations comprising:

receiving, from an audio sensor, an audio signal that includes concurrent responses from two or more respondents;

receiving input that defines a beginning time and an ending time to track votes;

processing a portion of the audio signal that includes the concurrent responses between the beginning time and the ending time defined by the input;

separating the portion of the audio signal into two or more distinct audio signals;

determining a concurrent response of each respondent by performing voice recognition on each of the two or more distinct audio signals separated from the portion of the audio signal, the concurrent responses indicating a plurality of audio signal intensities;

determining that a given one of the two or more respondents is associated with a given cultural group in response to detecting that a voice pattern of the given one of the two or more respondents matches a given voice pattern of the given cultural group;

summing two or more of the plurality of audio signal intensities associated with a first response type of the concurrent responses to generate a summed audio signal intensity of the first response type; and causing a crowd response to be displayed on a user interface associated with the machine based on the concurrent responses, determining that the given one of the two or more respondents is associated with the given cultural group, and the summed audio signal intensity of the first response type, wherein the crowd response indicates the first response type.

18. The non-transitory machine-readable storage medium of claim 17, wherein the operations further comprise:

subtracting a distinct voice from the portion of the audio signal to determine the concurrent response of each respondent.

19. The system of claim 1, wherein the operations further comprise:

determining a quantity of the concurrent responses associated with a given cultural group that comprise of a first response type; and identifying a response pattern for the given cultural group based on the quantity, wherein the response pattern indicates that the first response type is associated with the given cultural group.

20. The system of claim 1, wherein the operations comprise:

generating historical bidding patterns for bidders of different cultural groups to identify cultural properties of the bidders; and determining a starting bid for an item based on the cultural properties of the bidders.

* * * * *